United States Patent [19]

Hanson, Jr. et al.

[11] Patent Number: 4,484,831
[45] Date of Patent: Nov. 27, 1984

[54] PIPE OR TUBE ASSEMBLY UTILIZING A DIFFERENTIAL SCREW

[76] Inventors: Wallace A. Hanson, Jr.; Russell B. Hanson, both of 94 Valley Hill Rd., Riverdale, Ga. 30274

[21] Appl. No.: 423,066

[22] Filed: Sep. 24, 1982

[51] Int. Cl.³ .............................................. F16B 7/18
[52] U.S. Cl. ......................................... 403/7; 92/257; 403/47; 403/296; 403/306; 403/343
[58] Field of Search ..................... 403/47, 343, 7, 296, 403/339, 301, 306, 300; 285/191, 185, 175; 92/258, 257, 255; 187/1 R

[56] References Cited

U.S. PATENT DOCUMENTS

| | | | |
|---|---|---|---|
| 1,568,751 | 1/1926 | Lindhard | 92/257 |
| 2,298,516 | 10/1942 | Streib | 403/296 |
| 2,317,818 | 4/1943 | Skulkety | 403/296 X |
| 3,150,460 | 9/1964 | Dees | 403/296 X |
| 3,402,645 | 9/1968 | Nelson | 92/258 |
| 3,874,824 | 4/1975 | Cronstedt et al. | 403/47 X |

Primary Examiner—Cornelius J. Husar
Assistant Examiner—Joseph A. Fischetti
Attorney, Agent, or Firm—Newton, Hopkins & Ormsby

[57] ABSTRACT

Sections of hollow tubular pipe are joined together by one or more differentially threaded, axially mounted screw which threadedly engages internal radial flanges at the end portions of the adjacent pipes, an extension socket rotates the internal screw or screws.

11 Claims, 7 Drawing Figures

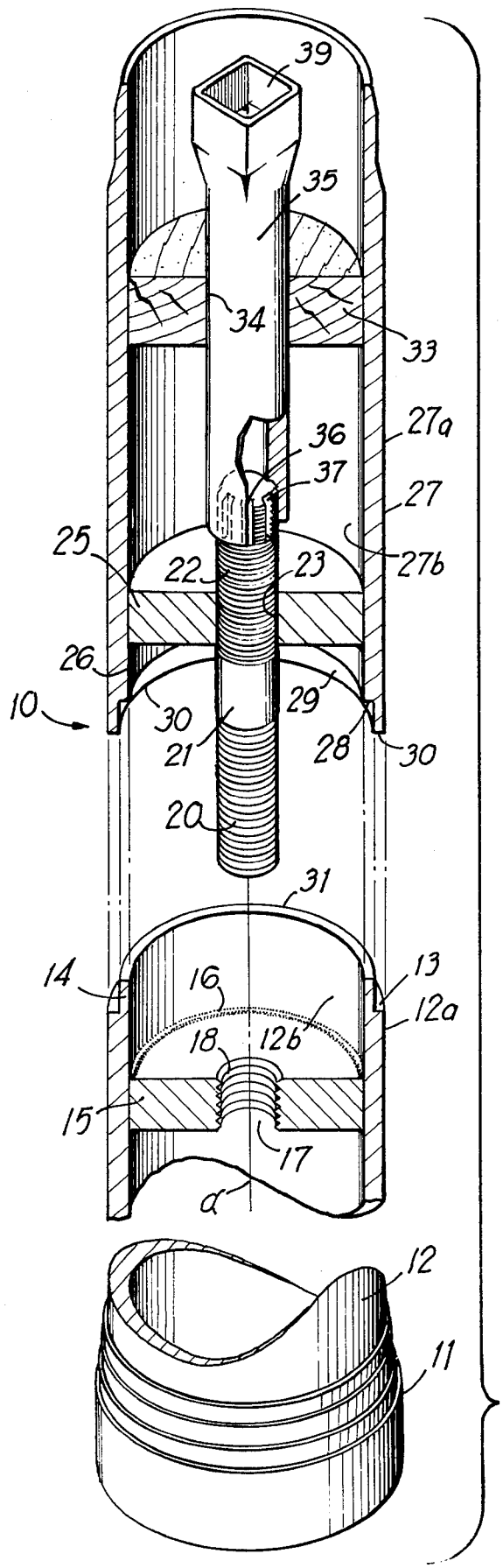
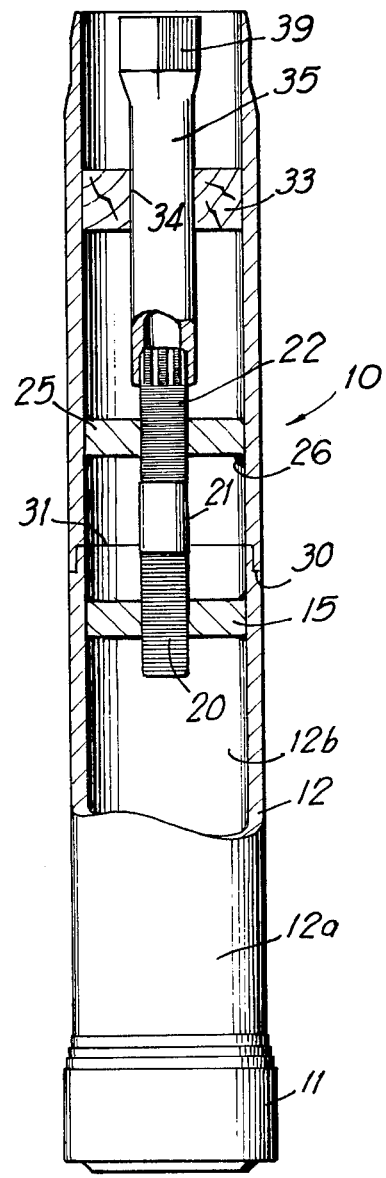
FIG 1
FIG 2

PIPE OR TUBE ASSEMBLY UTILIZING A DIFFERENTIAL SCREW

This invention relates to a pipe or tube assembly and is more particularly concerned with an assembly of pipe or tube sections utilizing a differential screw.

BACKGROUND OF THE INVENTION

In the past, since a hydraulic elevator requires a long piston rod, short sections of tubing have been joined together at the site so as to produce this long piston rod or piston which is moved vertically in the elevator shaft for lifting and lowering an elevator in the building. Hydraulic fluid is employed for actuating this piston rod.

Since the piston rod must be retracted into the cylinder for a substantial distance, care must be taken to assure that each section of the piston rod or piston is of the same diameter and that the sections of tube or pipe which make up the piston rod are aligned in coaxial relationship and there is a smooth transition from one piston rod to the next along the periphery of such sections. At times, it is necessary to disassemble these sections of tube or pipe so as to replace a particular section.

In the past, such joining of sections of tube or pipe together to form an extended piston rod have usually employed either welding or the clamping of tube or pipe sections together. Both processes are quite time consuming and require special tools and skilled labor in order to assemble properly.

SUMMARY OF THE INVENTION

Briefly described, the present invention includes a built-up piston or piston rod which is used primarily for raising and lowering a hydraulic elevator in an elevator shaft. Such built-up pistons or piston rods are necessary in order to provide a convenient means for transporting the piston rod by short sections to the construction site and for installing the piston rod through smaller doors into the elevator shaft, itself.

Such a piston rod is made up of sections of pipe or tube, the adjacent ends of which are provided with overlapping fittings having male and female end portions with internal and external peripheral shoulders for assuring co-axial alignment of the adjacent tubes or pipes. Within the adjacent tubes or pipes, close to the joint formed by them, are a pair of internally threaded discs which are fixed within the interior of the pipes. One disc is provided with a coarse thread and the other disc with a fine thread, whereby an externally threaded shaft, provided with coarse threads and fine threads, when rotated, will progressively draw the two discs together. The end of the take-up shaft is provided with a splined head on which is axially received a hollow tubular socket member which is moveable axially away from and toward the head of the shaft, the socket being guided by a guide disc disposed in the interior of one tube or pipe.

In one form of the invention, the other end of the pipe or tube is provided with a second internally threaded disc fixed within the other end portion of the pipe or tube and the socket of the socket member is of smaller dimensions than the diameter of the central hole of the second disc so that the socket may be rotated by an extension of a wrench, which passes through the hole of the second disc.

Accordingly, it is an object of the present invention to provide a pipe or tube assembly which can be readily and easily assembled and disassembled to provide a quite accurately aligned, elongated pipe or tube formed of short sections.

Another object of the present invention is to provide a pipe assembly formed of a plurality of sections of pipe or tubing, the pipe assembly being inexpensive to manufacture, durable in structure and efficient in operation.

Another object of the present invention is to provide a pipe assembly formed of a plurality of tandem arranged pipes, wherein the pipe assembly can be erected in the field, without skilled labor, while maintaining precision in the alignment of the sections of pipe.

Another object of the present invention is to provide a pipe assembly formed by butt joined pipes or tubes, the assembly being inexpensive and sections of which are capable of fabrication, prior to its transportation to the place of assembly.

Another object of the present invention is to provide a pipe assembly made up of a plurality of butt joined pipes and wherein each of the pipes is joined quite firmly and uniformly together.

Another object of the present invention is to provide a pipe assembly which, with little torque, can be joined together quite firmly.

Another object of the present invention is to provide a pipe assembly in which the internal joint is self locking in that it takes more force to loosen the joint, when formed, than to tighten it.

Another object of the present invention is to provide a pipe assembly formed of sections of pipe in which the abutting ends of the sections are sealed quite uniformly.

Another object of the present invention is to provide a pipe assembly formed of a plurality of sections of pipe wherein the sections are quite uniformly aligned and the joints are quite uniformly formed.

Other objects, features and advantages of the present invention will become apparent from the following description when taken in conjunction with the accompanying drawings wherein like characters of reference designate corresponding parts throughout the several views.

BRIEF DESCRIPTION OF THE DRAWING

FIG. 1 is an exploded, perspective, fragmentary view of a portion of a pipe assembly constructed in accordance with the present invention;

FIG. 2 is a partially broken away side elevational view of the assembled pipe depicted in FIG. 1;

DESCRIPTION OF THE PREFERRED EMBODIMENTS

Figure 3:
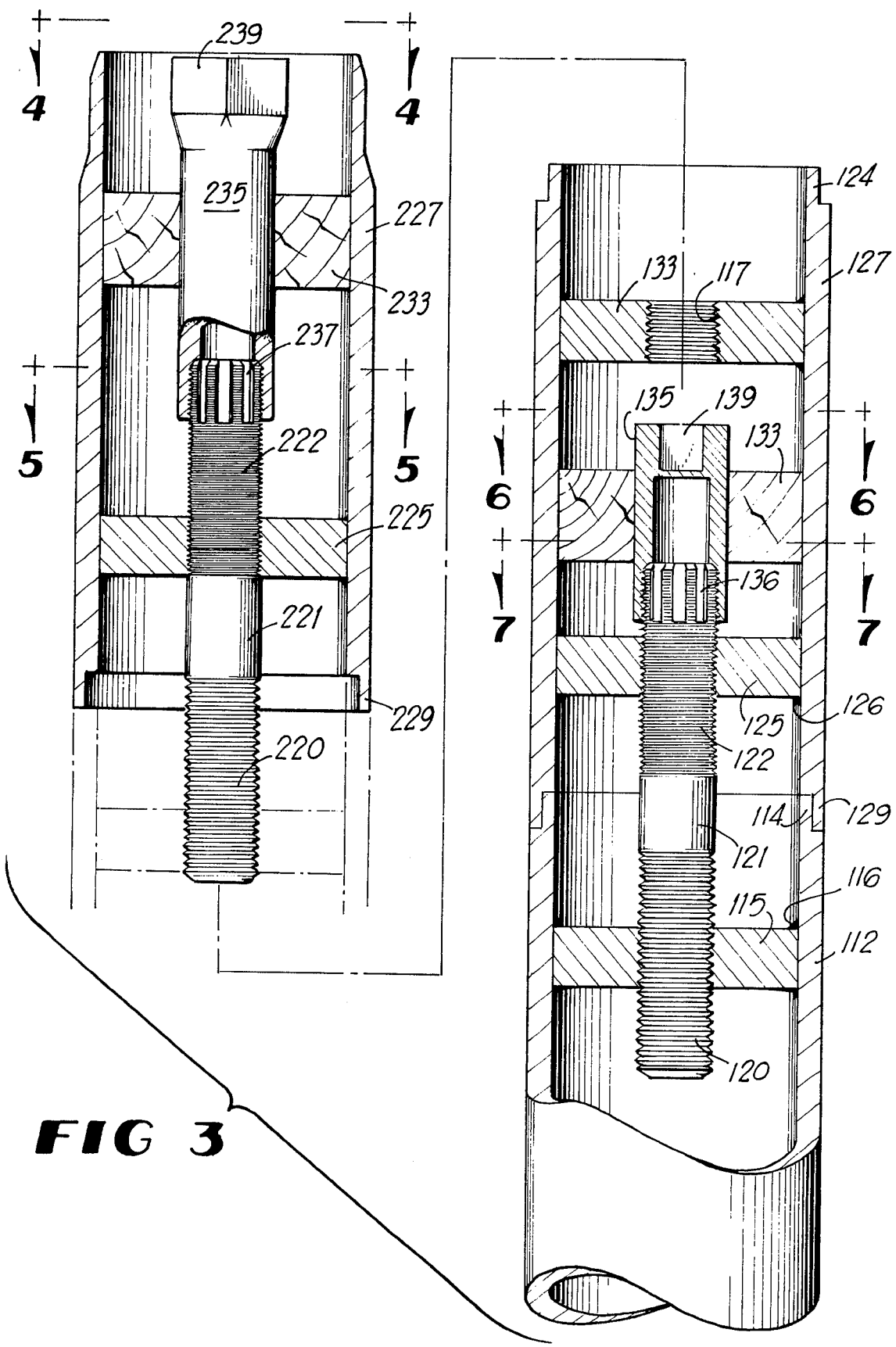
FIG. 3 is a partially broken away fragmentary side elevational view of three sections of pipe or tube being joined together according to the present invention.

Referring now in detail to the embodiments chosen for the purpose of illustrating the present invention, numeral 10 in FIGS. 1 and 2 denotes generally a piston rod or piston of a hydraulic cylinder (not shown) which is employed for raising and lowering an elevator (not shown) in an elevator shaft (not shown) by hydraulic fluid which passes into and out of the hydraulic cylinder, as desired. The present invention, however, is not limited to forming the piston or piston rod of such a hydraulic elevator system. Instead, the invention has wide application to the joining of pipes or tubes together so as to form an extended length of such pipes or tubes for a large variety of purposes.

In more detail, in FIGS. 1 and 2 it is seen that the piston rod 10 has a stop ring 11 which arrests the inward movement of the piston or piston rod 10. The stop ring 11 is connected to the lower end of a first section of tube or pipe, denoted generally by the numeral 12. This tube or pipe 12 is of uniform thickness and has an outside periphery 12a and an inside periphery 12b which are concentric with each other and both form cylindrical surfaces. At the upper or outer end of tube or pipe 12, there is provided a peripheral radially extending shoulder 13 outwardly of an upstanding circumferential axially extending shoulder 14. The shoulder 14 is concentric with the surfaces 12a and 12b, being disposed inwardly of periphery 12a and outwardly of periphery 12b.

Within the upper portion of the tube or pipe 12 is a circular flange or disc 15 which has a diameter equal to or slightly less than the inside diameter of surface 12b. This disc or flange 15 is welded, by welds 16, in a radial position across the upper end portion of the pipe or tube 12. Within the central portion of the disc or flange 15 there is provided an axial hole 17 along the axis, which flange is provided with coarse internal threads 18. In the preferred embodiment, there are seven threads to the inch for threads 18.

The internal threads 18 are adapted to receive the coarse helical external threads 20 on one end, i.e., the lower end portion of a take-up shaft 21. The upper or other end portion of the take up shaft 21 is provided with fine helical external threads 22 which are preferably approximately twelve threads to the inch. The coarse threads 20 and the fine threads 22 are both preferably in the same direction, namely right hand threads, even though, if desired, they can both be left hand threads. The fine external threads 22 of take-up shaft 21 are received in the internal threads 23 of a lower radial flange or disc 25 secured by welds 26 to the inner periphery 27b of a second section of tube or pipe 27, the tube or pipe 27 having an outer periphery 27a. Tube 27 and tube 12 are of identical diameter and thickness. The lower end of tube 27 is provided with radial shoulder 28 extending inwardly from a circumferential shoulder 29, the circumferental shoulder 29 being of an intermediate diameter between the diameter of inner periphery 27b and the diameter of periphery 27a. The height of peripheral shoulder 29 and shoulder 14 are equal to each other and there is approximately a 0.005 inch press fit in the diameter of shoulder 14 and shoulder 29 so that the lower end 30 of tube 27 will fit over the upper end 31 of tube 12 to about shoulder 28 as end 30 abuts shoulder 14. Thus there is provided a smooth continuous concentric surface formed by the outer peripheries 12a and 27a.

Spaced inwardly, i.e., upwardly of the disc or flange 25, is a guide block or disc 33 slip fitted into the interior of pipe or tube 27. This guide block 33 is preferably formed of wood and has a central hole 34 disposed along axis a, through which a hollow cylindrical tubular socket member 35 is inserted. The lower end of this socket member 35 is provided with a lower socket formed of a plurality of inwardly protruding circumferentially spaced teeth, such as tooth 36, which are received in radially extending slots 37 formed in the splined upper end portion of the take-up shaft 21. By axial movement of the socket member 35, its lower socket will engage and disengage the upper end of the take-up shaft 21, as desired.

The upper end of the socket member 35 is provided with a squared end or upper socket 39 which receives the end of a ratchet wrench (not shown). By manipulation of the wrench, the socket member 35 is rotated so as to move upwardly or downwardly, as desired, in flange or disc 25.

When it is desired to join the two tubes or pipes 12 and 27, the takeup shaft 21 is raised to the uppermost position shown in FIG. 1 and then the coarse threads 20 are inserted into the hole 17 and the socket 35 appropriately rotated so that the shaft 21 is screwed into the disc 15. Because of the differential between the fine pitch threads 22 (12 threads to the inch) and the coarse pitch threads 20, the take-up shaft 21 will be moved to a greater extent into disc 15 than it will be moved downwardly out of disc 25. Thus, the net effect is to draw end 30 over end 31 until end 31 abuts shoulder 28 and end 30 abuts shoulder 13, as shown in FIG. 2. At that time, the shaft 21 has been lowered with respect to both disc 15 and disc 25. Quite tight fits can be achieved through the rotation of the socket member 35. When the appropriate tightness has been achieved (which can readily be determined using a torque wrench), the ratchet wrench is removed from the upper socket 39 and, thereafter, the socket member 35 is removed from the upper end portion of the shaft 21, passing axially outwardly of tube or pipe 27.

Of course, if it is desired to separate the two pipes or tubes 12 and 27, the socket member 35 is again inserted through the central hole 34 in disc 33 so that the teeth 36 at the lower end of the socket 35 are again received in the slots 37. The wrench is then installed on socket member 39 and maniuplated to rotate the take-up shaft 21 so as to retract the threads 20 from the threads 18 and cause a progressive enlarging of the distance between the flanges or discs 15 and 25, thereby positively removing end 30 from end 31. The mechanical advantage provided by the differential threads 20 and 22 assures positive separation of the pipes 12 and 27 regardless of rust or corrosion at the joint or junction of ends 30 and 31. The take-up shaft 21, however, will act positively to urge the ends 30 and 31 apart and will permit limited manual rocking of one pipe 27 with respect to the other pipe 12 to thereby break the joint. The force or torque, necessary to unlock or disengage the end portions of the pipes 12 and 27, is greater than the force necessary to engage them and, therefore, the pipes, once joined together, as shown in FIG. 2, tend to stay joined together unless a rotational force is applied to shaft 21.

Figure 4:
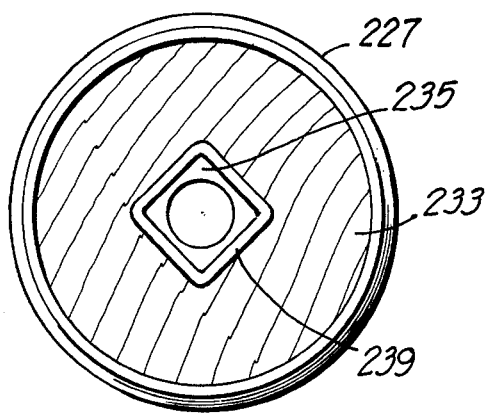
FIG. 4 is a cross-sectional view taken substantially along line 4—4 in FIG. 3.
Figure 6:
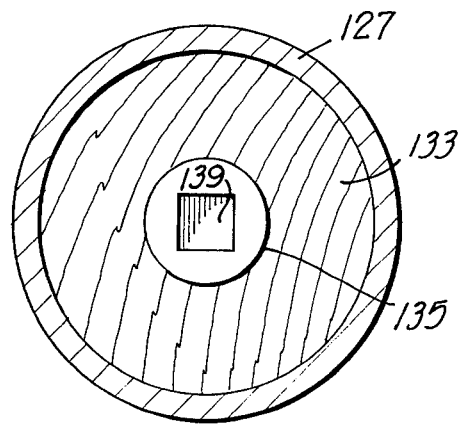
FIG. 6 is a cross-sectional view taken substantially along line 6—6 in FIG. 3.
Figure 5:
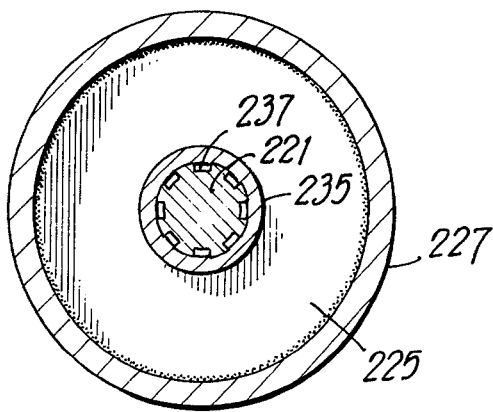
FIG. 5 is a cross-sectional view taken substantially along line 5—5 in FIG. 3.
Figure 7:
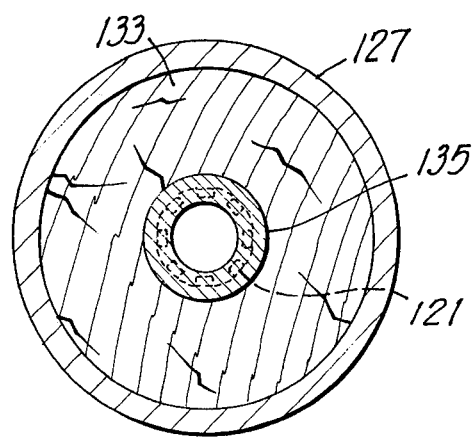
FIG. 7 is a cross-sectional view taken substantially along line 7—7 in FIG. 3.

In the embodiment depicted in FIGS. 3, 4 and 5, a second embodiment is shown wherein three or more sections of pipe or tube are connected together in tandem, according to the present invention. In FIG. 3, three pipe or tube sections 112, 127 and 227 are joined end to end, the end of pipe or tube 112 being provided with a male fitting 114, the pipe 127 being provided with a female fitting 129, at one end, and a male fitting 124 at its other end. Furthermore, the pipe or tube 227 is provided with a female fitting 229 which is identical to the female fitting 129. When the pipe 112 is joined to the pipe 127, the male fitting 114 is received in the female fitting 129 and when pipe 127 and pipe 227 are joined together, the male fitting 124 is received in the female fitting 229. In such an arrangement, the female fitting 129 overlaps the male fitting 114 while the female fitting 229 overlaps the male fitting 124.

For clamping the pipe 112 end-to-end with pipe 127, there is provided a take-up shaft 121 having fine threads 122 and coarse threads 120. The coarse threads 120 are received in a threaded central hole in a radial flange or disc 115 in the upper or male end portion of pipe 112 while the threads 22 are received within the internal threads of a disc 125 in the lower end or female end portion of the pipe 127. The disc 115 and 125 are fixed in the interiors of the pipes 112 and 127, respectively, by welding 116 and 126.

In the central portion of the pipe 127, there is a journal or guide 133 which receives and journals a socket member 135, the lower end of which is provided with a socket having internal teeth which are received in slots 136 of the splined upper end portion of the shaft 121. The upper end of the socket member 135 is provided with an internal square socket 139 which has dimensions smaller than the dimensions of a shaft 221 carried by the tube or pipe 227. The dimensions of the socket 139 are also less than the diameter of a central internally threaded hole 117 in an upper radial flange or guide 133 in the upper or male end portion of the pipe 127. When it is desired to manipulate the takeup shaft 121, a socket wrench extension (not shown) is inserted from male end 124 through the hole 117 and into the socket 139 and a socket wrench (not shown) is used to rotate the socket extension (not shown).

After tightening, the socket member 135 remains in a retained position in the guide block 133 and on the upper end of the shaft 121. The socket extension, however, is retracted through the hole 117. Thus, the ends of tubes 112 and 127 are firmly clamped together, due to the differential threads 120 and 122 on the shaft 121, thereafter, the upper tube 227 which is identical to tube 127 and has a guide block 233, a socket 235, a disc or flange 225, a central axially extending shaft 221 with fine threads 222 and coarse threads 220, all arranged in identical fashion to the corresponding elements depicted in FIGS. 1 and 2.

The upper section of the pipe assembly depicted in FIG. 3 is identical to the upper section of the pipe assembly depicted in FIGS. 1 and 2. Thus, its tube 227 receives a disc or flange 225 therein, the central hole of which threadedly receives the fine threads 222 at the upper end of shaft 221. The coarse threads 220 protrude from the lower or female end of fitting 229. Above the disc 225 is the guide block 233 which has a central hole which journals the socket member 235. The socket member 235 has a lower socket with teeth which are received in the slots 237 while the upper end of the socket member 235 is provided with a socket 239. The lower end of pipe 227 is installed on the upper end of pipe 127 by aligning the shaft 221 with hole 117 and then rotating the same using the socket member 235.

If desired, a plurality of intermediate tube sections such as tube 127 and its two discs 125 and 133 can be utilized, as desired, the pipe or tube 227 forming the uppermost pipe or tube and the pipe or tube 112 forming the lowermost pipe or tube.

It will be obvious that the disassembly of the pipes 112, 127, 227 follows the reverse procedure as that described above.

It will be obvious to those skilled in the art that many variations may be made in the embodiments here chosen for the purpose of illustrating the present invention, without departing from the scope thereof as defined by the appended claims.

We claim:

1. A piston rod assembly for hydraulic elevator comprising:
   (a) a first hollow cylindrical pipe or tube having a central axis and an open end;
   (b) a second hollow cylindrical pipe or tube having a central axis and open at both of its ends, said first pipe or tube and said second pipe or tube being arranged coaxially end-to-end with the open end of said first pipe or tube abutting one open end of the second pipe or tube said first pipe or tube and said pipe or tube being of the same outside diameter to form a pipe or tube joined at the abutting ends and having concentric and axially aligned outer peripheral surfaces;
   (c) a flange within the hollow interior adjacent to said abutting end of said first pipe or tube;
   (d) a second flange within the abutting end of said second pipe or tube; said first flange and said second flange having central axially aligned holes respectively therein, said flanges being respectively provided with internal threads of diferent pitch for said holes; and
   (e) a central shaft received in said holes, said shaft having separate external threads along opposite end portions of said shaft, said threads respectively coresponding in pitch to the pitches of the threads of said flanges whereby rotation of said shaft will cause movement of said pipes or tubes toward or away from each other.

2. The piston rod assembly defined in claim 1, wherein the end of said shaft, within said second pipe or tube, is provided with means by which said shaft is rotated, said end of said shaft being accessible through the other open end of said second pipe or tube.

3. The piston rod assembly defined in claim 1 in which the abutting ends of said first pipe or tube and said second pipe or tube overlap each other.

4. The pipe assembly defined in claim 3 wherein said pipes or tubes are the same diameter and the overlapping ends of said pipes or tubes have peripheral radially extending shoulders axially offset from each other for respectively receiving thereon the ends of the adjacent pipe or tube and also have circumferential concentric sufaces radially opposite to each other.

5. The piston rod assembly defined in claim 1 including a socket member in said second pipe or tube engaging the end portion of said shaft for rotating the same.

6. The piston rod assembly defined in claim 5 including a guide block within said second pipe or tube, said guide block having a central hole through which said socket member projects.

7. The pipe assembly defined in claim 6 including an additional flange within and adjacent to the other end of said second pipe or tube, said second flange having a hole with an axis aligned with the axis of the hole in said second flange and with the axis of said socket member and through which access may be had to said socket member for rotating the same.

8. The piston rod assembly defined in claim 1 wherein the pipes or tubes are cylindrical and the holes in the flanges are concentric with said pipes or tubes and wherein said shaft extends axially through said holes.

9. The piston rod assembly defined in claim 1 wherein the external threads along one portion of said shaft are approximately seven threads to the inch and the threads along the other portion of said shaft are approximately twelve threads per inch are helical threads in the same direction.

10. The piston rod assembly defined in claim 1 wherein said first flange and said second flange are discs respectively fixed to the inner surfaces of said first pipe or tube and said second pipe or tube.

11. The pipe assembly defined in claim 1 including a third pipe or tube, said first pipe or tube and said second pipe or tube and said third pipe or tube being cylindrical and of equal diameter and thickness and aligned axially and concentrically, one end of said third tube abutting the other end of said second tube to form a second joint, a pair of flanges respectively in the end portions of said second pipe or tube and said third pipe or tube, said pair of flanges having axially aligned holes, and a second shaft received in said holes, the end portions of said second shaft having threads of different pitch for threaded engagement with said flanges when said second shaft is received in said holes in said pair of flanges.

* * * * *